No. 857,542.  
PATENTED JUNE 18, 1907.

W. THAIN.  
MEASURING TOOL.  
APPLICATION FILED MAY 8, 1906.

Witnesses  
Inventor  
William Thain  
By Word & Word  
Attorneys

UNITED STATES PATENT OFFICE.

WILLIAM THAIN, OF NEWPORT, KENTUCKY, ASSIGNOR OF ONE-HALF TO CHARLES A. REBHUN, OF NORWOOD, OHIO.

MEASURING-TOOL.

No. 857,542.  Specification of Letters Patent.  Patented June 18, 1907.

Application filed May 8, 1906. Serial No. 315,825.

*To all whom it may concern:*

Be it known that I, WILLIAM THAIN, a citizen of the United States, residing at Newport, in the county of Campbell and State of Kentucky, have invented certain new and useful Improvements in Measuring - Tools, of which the following is a specification.

The object of my invention is to provide a pocket measuring tool having a flexible band forming the measuring tool constructed of bow-form so as to measure irregular curved surfaces.

The features of the invention are more fully set forth in the description of the accompanying drawings, forming a part of this specification, in which:—

Figure 1:
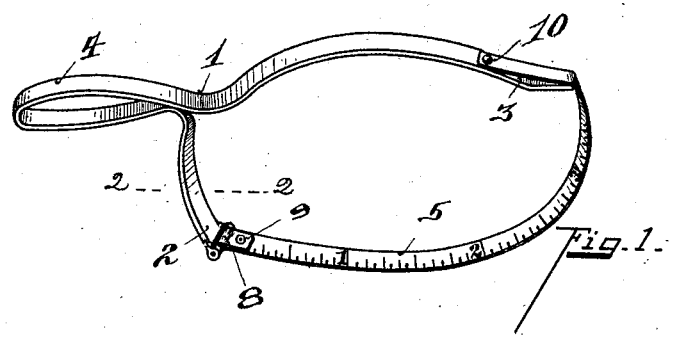
Figure 2:
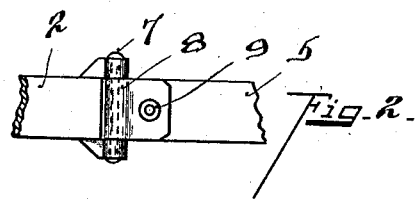
Figure 3:
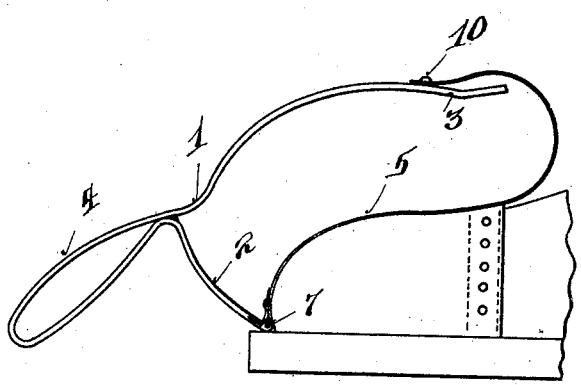

Figure 1 is a perspective view of the measuring tool. Fig. 2 is a section on line 2—2 Fig. 1. Fig. 3 is a diagram illustrating the method of measuring the toe of a shoe.

1 represents a support, preferably made of metal and of curved form having diverging arms of unequal lengths 2, 3.

4 represents a handle preferably formed by bending the supporting metal into the form shown.

5 represents a metallic tape having scale graduations thereon.

7 represents a pivot secured to ears on the terminal 2.

8 represents an eye loop formed by bending the tape over the pivot and securing the overlapping end to the body thereof by the rivet 9. Said pivot 7 serves as a base for the measuring and against which the article to be measured is abutted.

10 represents the pin connecting the forward end of the measuring tape to the terminal end 3 of the support.

In the preferred form of construction both the tape and the diverging arms which form a support are shown of bow or curved form, the extent of the bow curve of the measuring tape, is for the purpose of obtaining increased measuring length, without undue lengthening of the terminals of the support.

This measuring tool is primarily adapted to measuring the curvilinear distances of the toes, heels, counters of shoes and other similar articles.

The measuring tool is adapted to a large variety of uses. As constructed the pivot 7 and the terminal 2 of the support form an abutment to rest the tool against the surface to be measured from, the flexible tape readily conforms to the surface to be measured. The graduation marks of the scale being on the inner surface of the tape readily indicate the distances to different points on the article to be measured.

By the construction herein shown a one hand measuring tool is provided, so that the operator can hold the article in one hand and accurately measure with the other hand.

Having described my invention, I claim:—

1. A measuring tool comprising two diverging unequal arms bent into handle form at their inner ends, a flexible measuring tape connected respectively with the free ends of said diverging arms, substantially as described.

2. A measuring tool composed of a support bent to form a handle, and two diverging arms of unequal length projecting from the handle, and a flexible measuring tape connected to one of said arms and pivotally connected to the other diverging arm, substantially as described.

3. A measuring tool consisting of a support bent into handle form, and two diverging bow-shaped terminal arms of unequal lengths, a pivot on one of said arms, a flexible measuring tape pivotally secured upon said pivot, the opposite end of said tape attached to the end of the longer arm forming a bow-shaped measuring tool, substantially as described.

4. A measuring tool consisting of a support bent to form a handle, and two diverging unequal arms formed of one piece of metal, a flexible measuring tape connected respectively with the free ends of said diverging arms, substantially as described.

In testimony whereof, I have hereunto set my hand.

WILLIAM THAIN.

Witnesses:
 OLIVER B. KAISER,
 LUISE BECK.